United States Patent [19]

Murata et al.

[11] Patent Number: 4,901,051

[45] Date of Patent: Feb. 13, 1990

[54] PLATINUM TEMPERATURE SENSOR

[75] Inventors: Tsuneo Murata, Kyoto, Japan; Walter Gottshling, Schwabach, Fed. Rep. of Germany

[73] Assignee: Murata Manufacturing Co., Ltd., Japan

[21] Appl. No.: 239,195

[22] Filed: Aug. 31, 1988

[30] Foreign Application Priority Data

Sep. 4, 1987 [JP] Japan .................................. 62-222868

[51] Int. Cl.$^4$ .............................................. H01C 3/04
[52] U.S. Cl. ..................................... 338/25; 338/308; 29/612
[58] Field of Search ................. 338/25, 287, 292, 300, 338/308; 29/610.1, 612; 427/124, 125

[56] References Cited

U.S. PATENT DOCUMENTS

| 3,781,749 | 12/1973 | Iles et al | 338/25 |
| 3,845,443 | 10/1974 | Fisher | 338/25 |
| 4,028,657 | 6/1977 | Reichelt | 338/308 |
| 4,050,052 | 9/1977 | Reichelt et al. | 338/308 |

Primary Examiner—B. A. Reynolds
Assistant Examiner—M. M. Lateef
Attorney, Agent, or Firm—Ostrolenk, Faber, Gerb & Soffen

[57] ABSTRACT

A platinum temperature sensor has a plurality of stacked plate-type ceramic sheets, platinum resistance patterns provided on the surfaces of the respective ceramic sheets so that each of the platinum resistance patterns has a plurality of bent portions, and connecting means for connecting adjacent ones of the platinum resistance patterns with each other, the patterns being provided between the ceramic sheets. The connecting means comprises through holes provided in the ceramic sheets and metal paste members arranged in the through holes to interconnect respective ends of the platinum resistance patterns.

18 Claims, 2 Drawing Sheets

PLATINUM TEMPERATURE SENSOR

BACKGROUND OF THE INVENTION

1. Field of the Invention

The present invention relates to a platinum temperature sensor, and more particularly, it relates to a platinum temperature sensor employing a platinum resistance thermometer.

2. Description of the Prior Art

Platinum, being chemically stable and having high temperature dependency of electrical resistance, is applied as a material for a temperature sensor. In a conventional platinum temperature sensor, a platinum wire is spirally wound on an insulator, or a platinum resistance pattern is formed as a thick or thin film on a single plate-type alumina substrate, as shown in U.S. Pat. Nos. 4,028,657, 4,050,052 or 3,781,749.

However, the winding type platinum temperature sensor is high in cost and cannot be sufficiently reduced in size, and high resistance values cannot be attained. In the platinum temperature sensor employing a single alumina substrate, on the other hand, the size must be increased in order to attain a high resistance value, while a high resistance value cannot be attained if the size is reduced.

U.S. Pat. No. 3,781,749 discloses a platinum temperature sensor which is obtained by stacking platinum patterns which are formed in a linear straight manner on each layer. However, this sensor has problems similar to those of the aforementioned conventional platinum temperature sensors since sufficient pattern length cannot be attained in each layer.

SUMMARY OF THE INVENTION

An object of the present invention is to obtain a small-sized platinum temperature sensor having a high resistance value at a low cost.

A platinum temperature sensor according to the present invention comprises a plurality of stacked plate-type ceramic sheets, platinum resistance patterns formed on the surfaces of respective ceramic sheets so that each of the platinum resistance patterns has a plurality of bent portions, and connecting means for connecting adjacent ones of the platinum resistance patterns with each other, the connecting means being provided between the ceramic sheets.

The connecting means may be formed by through holes provided in the ceramic sheets, and metal paste members arranged in the through holes, which are continuous with both ends of the platinum resistance patterns. The platinum temperature sensor may further be provided with through holes on the outermost one of the ceramic sheets communicating with the bent portions of the platinum resistance pattern located under the outermost ceramic sheet. Resistance adjusting lines may be provided on the outer surface of the outermost ceramic sheet and connected to the platinum resistance pattern located under the outermost ceramic sheet through the through holes. Each such resistance adjusting line may adjust the resistance of the platinum resistance pattern, by conductively interconnecting the corresponding bent portions of the pattern to which it is connected; and such resistance adjusting lines may be cut, to eliminate such interconnecting of the bent portions. Further, lead wires may be connected by means of electrode paste members to both ends of the platinum resistance patterns which are connected with each other by the connecting means.

The platinum temperature sensor measures temperature as a function of linear variations in the electrical resistance of the platinum resistance patterns, which serve as temperature sensing elements, said variations being caused by temperature change.

In the platinum temperature sensor according to the present invention, the platinum resistance patterns, each having a plurality of bent portions, are formed on the surfaces of the plurality of stacked plate-type ceramic sheets. Adjacent ones of the platinum resistance patterns provided between the ceramic sheets are connected with each other by the connecting means. Thus, the platinum resistance patterns can be greater in length than in conventional platinum resistance patterns, so a high resistance value can be attained with a senser having a small size. Further, the manufacturing cost is reduced since the temperature sensor is formed by stacking a plurality of ceramic sheets. According to the present invention, therefore, a platinum temperature sensor can be obtained with a lower cost, a smaller size and a higher resistance value, as compared with the conventional platinum temperature sensor.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
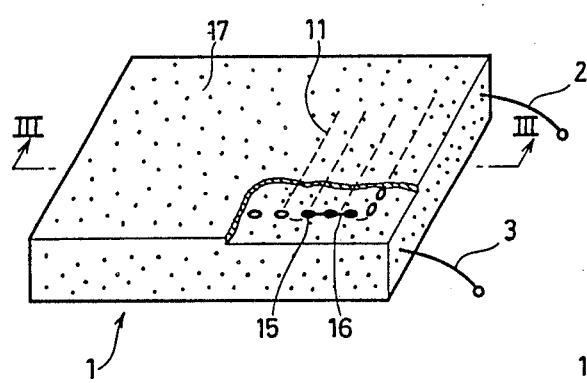
FIG. 1 is a partially fragmented perspective view showing an embodiment of the present invention.

FIG. 1 is a partially fragmented perspective view showing an embodiment of the present invention. Referring to FIG. 1, a platinum temperature sensor according to the present invention comprises a platinum temperature sensor body 1 and a pair of lead wires 2 and 3 extending from the platinum temperature sensor body 1. The platinum temperature sensor body 1 is formed of four plate-type ceramic sheets which are integrally fired after being stacked.

Figure 2:
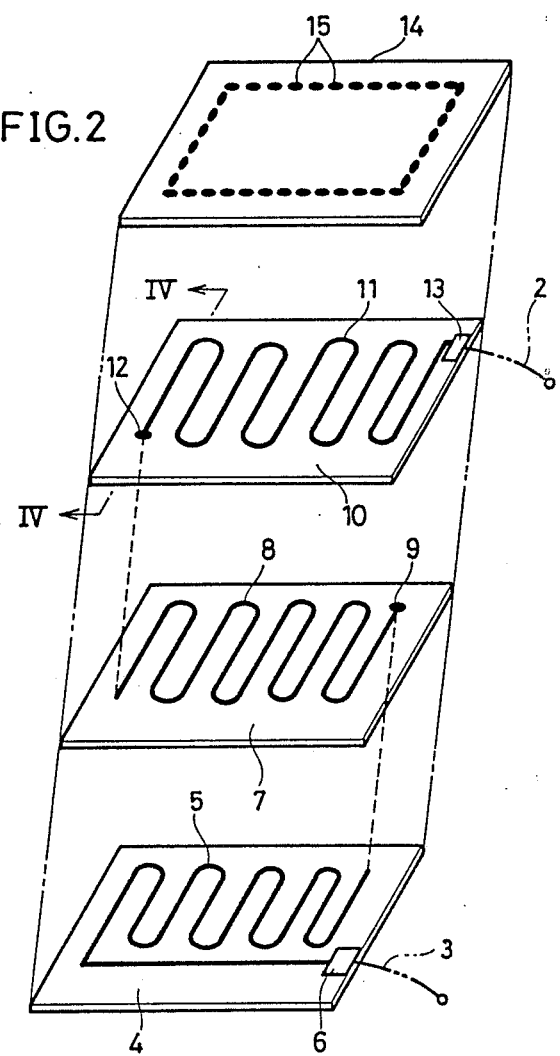
FIG. 2 is an exploded perspective view of the embodiment shown in FIG. 1.

FIG. 2 is a perspective view showing the embodiment of FIG. 1 in an exploded manner. Referring to FIG. 2, the lowermost ceramic sheet 4 is provided on its upper surface with a platinum resistance pattern 5 which is formed in a zigzag manner. A first end portion of the platinum resistance pattern 5 is linearly extended from the zigzag portion, and said first end portion is connected to an electrode 6 which is formed in a portion at a peripheral edge of the ceramic sheet 4. A ceramic sheet 7 provided on the ceramic sheet 4 also has a zigzag platinum resistance pattern 8 on its upper surface. A first end of the platinum resistance pattern 8 is vertically aligned with the second end of the platinum resistance pattern 5. The ceramic sheet 7 is provided with a perpendicular through hole 9 at the first end portion of the platinum resistance pattern 8, which is aligned with the second end of the platinum resistance pattern 5. A ceramic sheet 10 provided on the ceramic sheet 7 also has a zigzag platinum resistance pattern 11. The ceramic sheet 10 has a perpendicular through hole 12 at a first end portion of the platinum resistance pattern 11, which is aligned with the second end of the platinum resistance pattern 8, the latter being provided with no through hole. The second end of the platinum resistance pattern 11 is connected to an electrode 13 which is formed at a peripheral edge of the ceramic sheet 10.

A ceramic sheet 14 provided on the ceramic sheet 10 has a large number of through holes 15, which are formed slightly inside peripheral edges of the ceramic sheet 14 in positions of the zigzag pattern corresponding to bent portions of the platinum resistance pattern 11 provided under the same.

The lead wires 2 and 3 are respectively connected to the electrodes 13 and 6 by silver baking. As shown in FIG. 1, some of the through holes 15 are connected with each other by resistance adjusting lines 16 which are applied/fired onto the upper surface of the ceramic sheet 14 in positions corresponding to bent portions of the platinum resistance pattern 11. The resistance adjusting lines 16 are adapted to electrically connect the bent portions of the platinum resistance pattern 11 with each other through the through holes 15.

Figure 3:
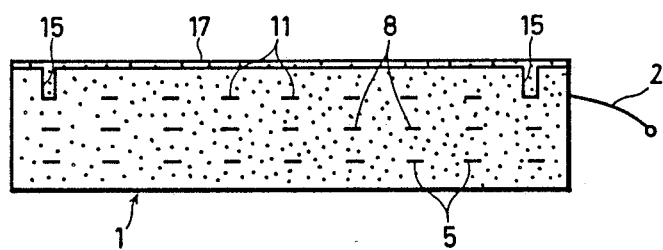
FIG. 3 is a sectional view taken along the line III—III in FIG. 1.

A ceramic slurry layer 17 is further applied onto the upper surface of the ceramic sheet 14, as shown in FIG. 1. The ceramic slurry layer 17 is adapted to fill up those of the through holes 15 which are not provided with the resistance adjusting lines 16, as shown in FIG. 3. Thus, the platinum resistance pattern 11 and the resistance adjusting lines 16 are prevented from outward exposure.

Figure 4:
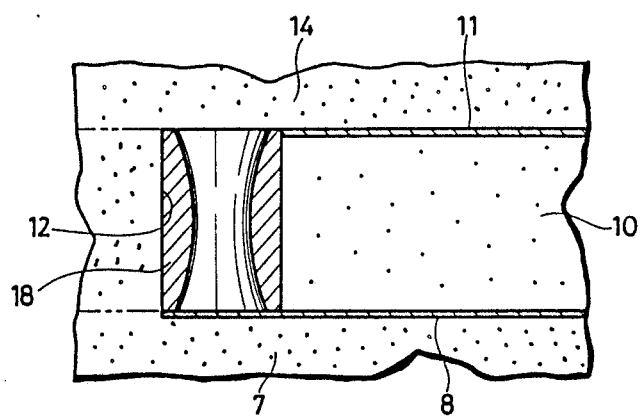
FIG. 4 is a sectional view taken along the line IV—IV in FIG. 2.

As shown in FIG. 4, a connecting line 18 of silver paste is provided in the through hole 12. The lower end of the connecting line 18 is electrically connected to the second end of the platinum resistance pattern 8 while the upper end thereof is connected to the first end of the platinum resistance pattern 11, thereby electrically connecting the platinum resistance patterns 8 and 11 with each other. The through hole 9 (see FIG. 2) is structured similarly to the through hole 12, thereby to electrically connect the platinum resistance patterns 5 and 8 with each other.

The platinum temperature sensor can be disposed in a circuit for carring out temperature measurement by the Wheatstone bridge method or the constant current process, for example. The platinum resistance patterns 5, 8 and 11 serve as temperature sensing elements whose electrical resistance changes linearly with temperature, thereby measuring the temperature of the object. The platinum resistance patterns 5, 8 and 11, being sealed by the ceramic sheets 4, 7 and 10 and the ceramic slurry layer 17, do not deteriorate due to contact with the atmosphere and have excellent moisture resistance.

The resistance of the platinum resistance patterns 5, 8 and 11 is adjusted by selectively cutting the resistance adjusting lines 16 prior to application of the ceramic slurry layer 17. After such resistance adjustment, the ceramic slurry layer 17 is formed on the ceramic sheet 14 to cover the through holes 15 and the resistance adjusting lines 16, thereby improving resistance against the atmosphere and moisture.

A method of manufacturing the aforementioned platinum temperature sensor will now be described. First, four ceramic green sheets are prepared, corresponding to the ceramic sheets 4, 7, 10 and 14 shown in FIG. 2. The platinum resistance patterns 5, 8 and 11 are provided on three of the ceramic green sheets, and the through holes 15 are formed in the remaining ceramic green sheet. The platinum resistance patterns 5, 8 and 11 may be provided in the form of thick films applied by silk screening, or in the form of thin films provided by evaporation, etc. Then the through holes 9 and 12 and the electrodes 6 and 13 shown in FIG. 2 are formed on the ceramic green sheets provided with the platinum resistance patterns 5, 8 and 11.

The four ceramic green sheets thus obtained are stacked as shown in FIG. 2, and connected with each other under pressure. Then, the resistance adjusting lines 16 are so applied as to connect the through holes 15 corresponding to the bent portions of the platinum resistance pattern 11. The laminate thus obtained is cofired, thereby providing the platinum temperature sensor body 1. The lead wires 2 and 3 are connected to the electrodes 6 and 13 of the platinum temperature sensor body 1 by silver baking.

Then, the resistance of the platinum resistance patterns 5, 8 and 11 of the platinum temperature sensor body 1 is measured through the lead wires 2 and 3, and the resistance adjusting lines 16 may be cut to attain a prescribed resistance. The ceramic slurry layer 17 is applied onto the upper surface of the platinum temperature sensor body 1, to cover the through holes 15 and the resistance adjusting lines 16. Further, the entire body is fired to integrally fix the ceramic slurry layer 17 to the platinum temperature sensor body 1, thereby providing the platinum temperature sensor as shown in FIG. 1.

Figure 5:
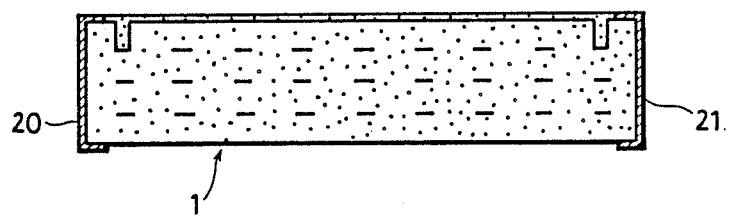
FIG. 5 is a sectional view corresponding to FIG. 3, showing another embodiment of the present invention.

Other Embodiments (a) The lead wires 2 and 3 may be replaced by outer electrodes 20 and 21 as shown in FIG. 5, by applying silver paste on side wall surfaces of the platinum temperature sensor body 1.

(b) Instead of resistance adjustment performed by cutting the previously formed resistance adjusting lines 16 as shown in FIG. 1, the adjustment can be performed by coupling the through holes 15 appropriately by silver baking.

(c) The ceramic slurry layer 17 may be replaced by a glass coating layer.

(d) The means for connecting the platinum resistance patterns 5, 8 and 11 is not restricted to the through holes 9 and 12 and the connecting line 18. The platinum resistance patterns 5, 8 and 11 may be connected with each other by externally provided connecting lines.

(e) Since the number of the platinum resistance patterns is not restricted to three, the patterns may arbitrarily be formed on two or more layers.

(f) Since the platinum resistance patterns 5, 8 and 11 are not restricted to those illustrated with reference to the above embodiment, arbitrary patterns may be appropriately employed in response to the mode of application.

(g) The lead wires 2 and 3 may be connected when the laminate of the ceramic green sheets is cofired. In this case, the lead wires 2 and 3 are prepared from a material having a high melting point, to withstand the temperature for firing the laminate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A platinum temperature sensor comprising:
   a plurality of stacked plate-type ceramic sheets;
   platinum resistance patterns provided on surfaces of respective said ceramic sheets, each of said platinum resistance patterns having a plurality of bent portions and thereby having a nonlinear configuration; and
   connecting means for connecting adjacent ones of said platinum resistance patterns with each other;
   wherein an outermost one of said ceramic sheets has through holes communicating with an outermost one of said platinum resistance patterns, which is located adjacent said outermost ceramic sheet.

2. A platinum temperature sensor in accordance with claim 1, wherein said connecting means comprises through holes provided in said ceramic sheets and metal paste members provided in said through holes to electrically interconnect said platinum resistance patterns.

3. A platinum temperature sensor in accordance with claim 1, wherein said ceramic sheets are a cofired stack of ceramic sheets.

4. A platinum temperature sensor in accordance with claim 1, further comprising outer electrodes provided on side surfaces of said stacked ceramic sheets and made of metal paste members, and connected to corresponding free ends of said platinum resistance patterns remote from said connecting means.

5. A platinum temperature sensor in accordance with claim 1, further comprising resistance adjusting lines provided on the outer surface of said outermost ceramic sheet and connected to said platinum resistance pattern located adjacent said outermost ceramic sheet through at least some of said through holes in said outermost ceramic sheet.

6. A platinum temperature sensor in accordance with claim 5, further comprising a ceramic slurry layer covering the surface of said outermost ceramic sheet and filling up those of said through holes not being provided with said resistance adjusting lines.

7. A platinum temperature sensor in accordance with claim 1, wherein said outermost through holes are located in positions corresponding to said bent portions of said platinum resistance pattern.

8. A platinum temperature sensor in accordance with claim 1, wherein said platinum resistance patterns are provided in a zigzag configuration.

9. A platinum temperature sensor in accordance with claim 1, further comprising lead wires connected to corresponding free ends of said platinum resistance patterns remote from said connecting means.

10. A method of manufacturing a platinum temperature for comprising the steps of:
    applying platinum resistance patterns to respective surfaces of a plurality of ceramic sheets, each of said patterns having a plurality of bent portions and thereby having a nonlinear configuration;
    stacking said plurality of ceramic sheets;
    interconnecting adjacent ones of said platinum resistance patterns on respective ones of said ceramic sheets; and
    providing through holes in an outermost one of said ceramic sheets, said through holes communicating with an outermost one of said platinum resistance patterns which is located adjacent said outermost ceramic sheet.

11. A method as claimed in claim 10, further comprising connecting lead wires to corresponding free ends of said platinum resistance patterns remote from said connecting means.

12. A method as claimed in claim 10, wherein said interconnecting step includes disposing metal paste material in through holes in said ceramic sheets, said metal paste material communicating with and thereby interconnecting said platinum resistance patterns.

13. A method as claimed in claim 10, further comprising cofiring said stacked plurality of ceramic sheets.

14. A method as claimed in claim 10, further comprising providing outer electrodes on side surfaces of said stacked ceramic sheets and made of metal paste members, and connected to corresponding free ends of said platinum resistance patterns remote from said connecting means.

15. A method as claimed in claim 10, further comprising providing resistance adjusting lines on the outer surface of said outermost ceramic sheet and connected to said platinum resistance pattern located adjacent said outermost ceramic sheet through at least some of said through holes in said outermost ceramic sheet.

16. A method as claimed in claim 15, further comprising providing a ceramic slurry layer covering the surface of said outermost ceramic sheet and filling up those of said through holes not being provided with said resistance adjusting lines.

17. A method as claimed in claim 10, wherein said platinum resistance patterns are applied in a zigzag configuration.

18. A method as claimed in claim 10, wherein said through holes are located in positions corresponding to said bent portions of said outermost platinum resistance pattern.

* * * * *